(12) United States Patent
Dolinskiy

(10) Patent No.: US 11,738,612 B2
(45) Date of Patent: Aug. 29, 2023

(54) INSERT FOR ADAPTING A HITCH COVER TO VARIOUS SIZE HITCH RECEIVERS

(71) Applicant: Viktor Dolinskiy, Matthews, NC (US)

(72) Inventor: Viktor Dolinskiy, Matthews, NC (US)

(*) Notice: Subject to any disclaimer, the term of this patent is extended or adjusted under 35 U.S.C. 154(b) by 160 days.

(21) Appl. No.: 17/446,908

(22) Filed: Sep. 3, 2021

(65) Prior Publication Data
US 2023/0073025 A1 Mar. 9, 2023

(51) Int. Cl.
*B60D 1/60* (2006.01)

(52) U.S. Cl.
CPC .................................. *B60D 1/605* (2013.01)

(58) Field of Classification Search
CPC ................................. B60D 1/60; B60D 1/605
See application file for complete search history.

(56) References Cited

U.S. PATENT DOCUMENTS

| | | | |
|---|---|---|---|
| 6,105,989 A * | 8/2000 | Linger | B60D 1/241 280/506 |
| 6,176,506 B1 | 1/2001 | Blake | |
| 6,199,892 B1 | 3/2001 | Dahl | |
| 6,357,780 B1 | 3/2002 | Young | |
| 6,412,806 B1 | 7/2002 | Peacock | |
| 6,463,686 B1 | 10/2002 | Eisenbraun | |
| 6,655,822 B1 | 12/2003 | Sylvester | |
| 6,688,804 B1 * | 2/2004 | Parent | B60D 1/52 403/345 |
| 6,834,879 B1 * | 12/2004 | Lorman | B60D 1/06 280/483 |
| 6,857,652 B2 | 2/2005 | Dougherty | |
| 6,908,096 B2 * | 6/2005 | Lewis | B60D 1/60 280/507 |
| 6,910,705 B1 * | 6/2005 | Harwood | B60D 1/60 40/575 |
| 7,021,646 B1 | 4/2006 | Cheng et al. | |
| 7,125,035 B1 | 10/2006 | Huenefeld | |
| 7,717,455 B2 * | 5/2010 | Morris | B60D 1/07 280/491.5 |
| 7,726,681 B2 * | 6/2010 | McKendry | B60D 1/241 280/506 |
| 8,562,013 B1 | 10/2013 | Wentz, Jr. | |
| 8,752,856 B2 * | 6/2014 | Sarajian | B60D 1/605 280/507 |
| 9,834,052 B2 | 12/2017 | Corless et al. | |
| 9,981,513 B2 * | 5/2018 | Belinky | B60D 1/605 |
| 10,220,661 B1 * | 3/2019 | Gebheim | B60D 1/30 |
| 11,465,458 B1 * | 10/2022 | Dolinskiy | B60D 1/241 |

(Continued)

*Primary Examiner* — Kevin Hurley
(74) *Attorney, Agent, or Firm* — Dunlap Bennett & Ludwig, PLLC

(57) ABSTRACT

A hitch insert set, hitch system, and method of coupling a hitch cover to a hitch receiver are generally disclosed herein. The hitch system includes a hitch receiver designed to couple to a vehicle, with the hitch receiver defining a receiver opening. The hitch system further includes a hitch cover comprising a tube portion and a cover portion that substantially covers the receiver opening. At least one hitch insert from a hitch insert set couples to the hitch receiver and the tub portion, in use, with the at least one hitch insert filling a gap between the hitch receiver and the tube portion of the hitch cover. The tube portion coupled coupled within the receiver opening such that the tube portion is at least partially retained in place by the at least one hitch insert.

10 Claims, 4 Drawing Sheets

(56) References Cited

U.S. PATENT DOCUMENTS

2007/0235983 A1 10/2007 Braun
2014/0300083 A1 10/2014 Barklage
2022/0251893 A1* 8/2022 Komaromi ......... B62D 33/0273

* cited by examiner

INSERT FOR ADAPTING A HITCH COVER TO VARIOUS SIZE HITCH RECEIVERS

BACKGROUND OF THE INVENTION

The present invention relates to hitch covers and, more particularly, to a hitch cover tube adapter.

Hitch covers are commonly used to cover hitch receivers on vehicles when the hitch receiver is not in use. Functionally, they cover and protect the hitch opening, and may be decorative in nature. Hitches may be used to couple vehicles to various structures for towing, such as, but not limited to, trailers, cargo carriers, and bicycle racks. Trailer hitch receivers are typically various sizes, including, but not limited to, 1.25 inches, 2 inches, and 3 inches.

When replacing vehicles, the vehicle owner may come to discover that the hitch cover being used on a previous vehicle is not properly sized for the new vehicle. For example, the hitch cover may be 1.25 inches, while the new receiver opening is 2 or 3 inches in size. Similar issues may occur when a vehicle owner purchases a new hitch cover, with the new cover being mistakenly improperly sized for the vehicle hitch receiver. Since, in many cases, the ornamentation of the hitch cover is important, being forced to replace the hitch cover with another (different in appearance) one is an undesirable, forced option.

As can be seen, there is a need for a hitch cover tube adapter that permits a hitch cover to be adapted to connect to various size receivers.

SUMMARY OF THE INVENTION

In one aspect of the present invention, a hitch system comprises: a hitch receiver configured to couple to a vehicle, the hitch receiver defining a receiver opening; a hitch cover comprising a tube portion and a cover portion that substantially covers the receiver opening; and at least one hitch insert coupled to the hitch receiver and the tube portion, the at least one hitch insert being shaped and dimensioned such that the at least one hitch insert fills a gap defined between the hitch receiver and the tube portion of the hitch cover, and the tube portion being coupled within the receiver opening such that the tube portion is at least partially retained in place by the at least one hitch insert.

In another aspect of the present invention, a method of coupling a hitch cover to a hitch receiver comprises the steps of: providing a hitch receiver configured to couple to a vehicle, the hitch receiver defining a substantially square-shaped receiver opening; providing a hitch cover comprising a tube portion and a cover portion that substantially covers the receiver opening; providing at least one hitch insert coupled to the hitch receiver and the tube portion, the at least one hitch insert being shaped and dimensioned such that the at least one hitch insert fills a gap defined between the hitch receiver and the tube portion of the hitch cover; and coupling the tube portion within the receiver opening such that the tube portion is at least partially retained in place by the at least one hitch insert.

These and other features, aspects and advantages of the present invention will become better understood with reference to the following drawings, description and claims.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF THE INVENTION

Figure 1:
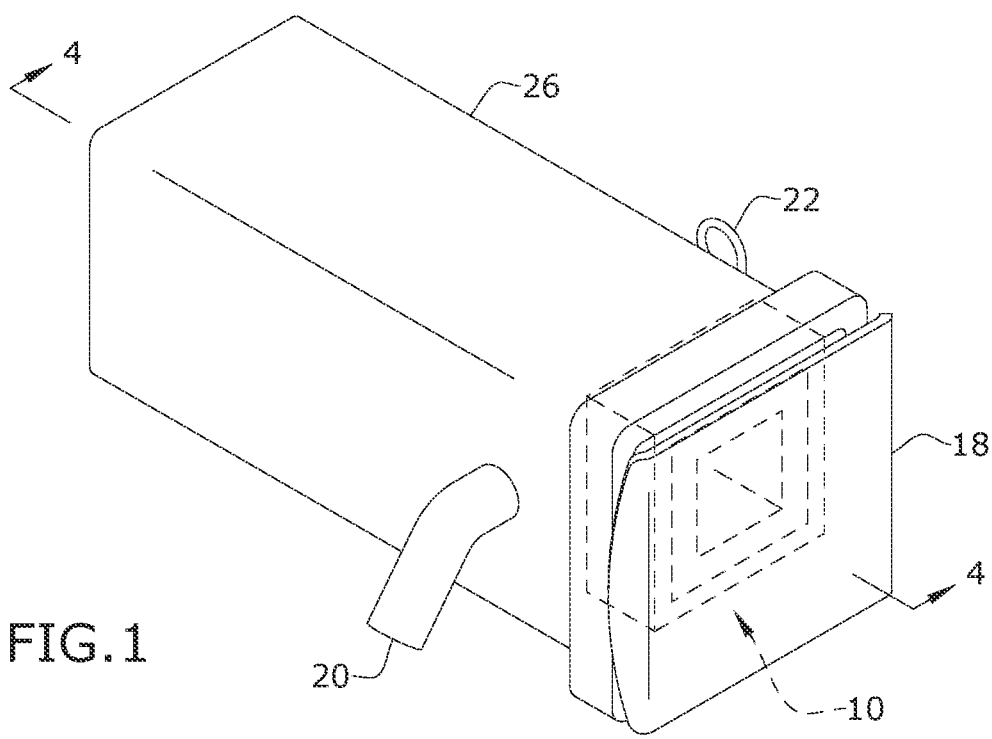
FIG. 1 is a perspective view of an embodiment of the present invention, shown in-use.

The subject disclosure is described with reference to the drawings, wherein like reference numerals are used to refer to like elements throughout. In the following description, for purposes of explanation, numerous specific details are set forth in order to provide a thorough understanding of the present disclosure such that one skilled in the art will be enabled to make and use the present invention. It may be evident, however, that the present disclosure may be practiced without some of these specific details.

Broadly, one embodiment of the present invention is a foam adapter set that allows a hitch cover to be installed on larger size hitch receivers. As discussed, prior to the present invention, this was not possible. Owners and vehicle operators were otherwise forced to purchase a new hitch cover that was sized properly for the vehicle. Because of the present invention, a hitch cover can be adapted to be fit with virtually any larger size hitch receiver.

In certain aspects of the present invention, a hitch insert set is provided that includes: a first hitch insert that is substantially square-shaped with an opening being defined in a central portion thereof; a second hitch insert that is substantially square-shaped with an opening being defined in a central portion thereof; and a third hitch insert that is substantially square-shaped with an opening being defined in a central portion thereof. In the presently described embodiment, the second hitch insert nests in the first hitch insert and the third hitch insert nests in the second hitch insert. The outermost hitch insert (in the described embodiment, the first hitch insert) has peripheral edges that physically contact inner edges of a receiver opening that retains the hitch cover. The innermost hitch insert (in the described embodiment, the third hitch insert) includes inner edges that physically contact a tube portion of the hitch cover.

Figure 5:
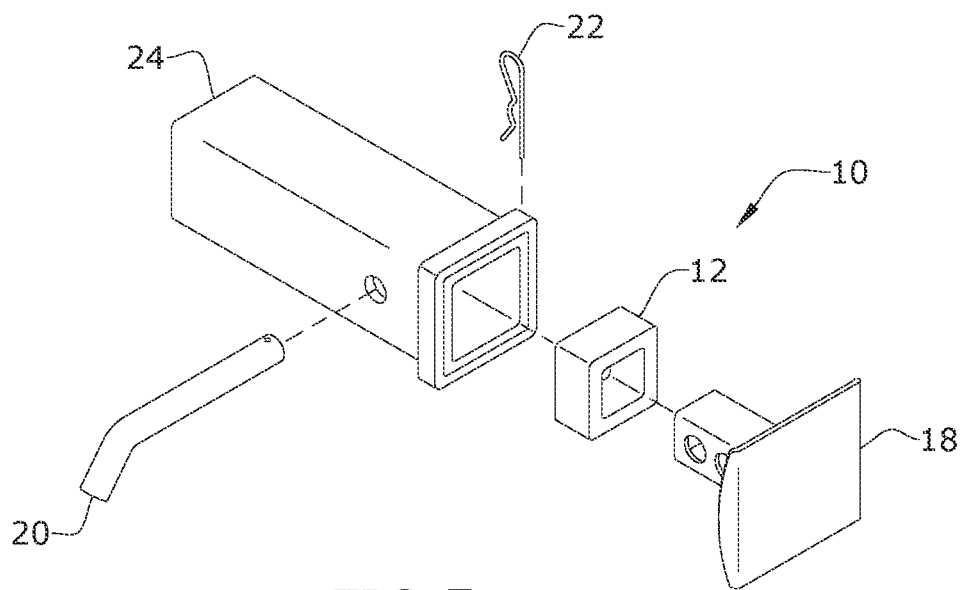
FIG. 5 is an exploded view of the embodiment of the present invention, shown with a small size receiver.
Figure 6:
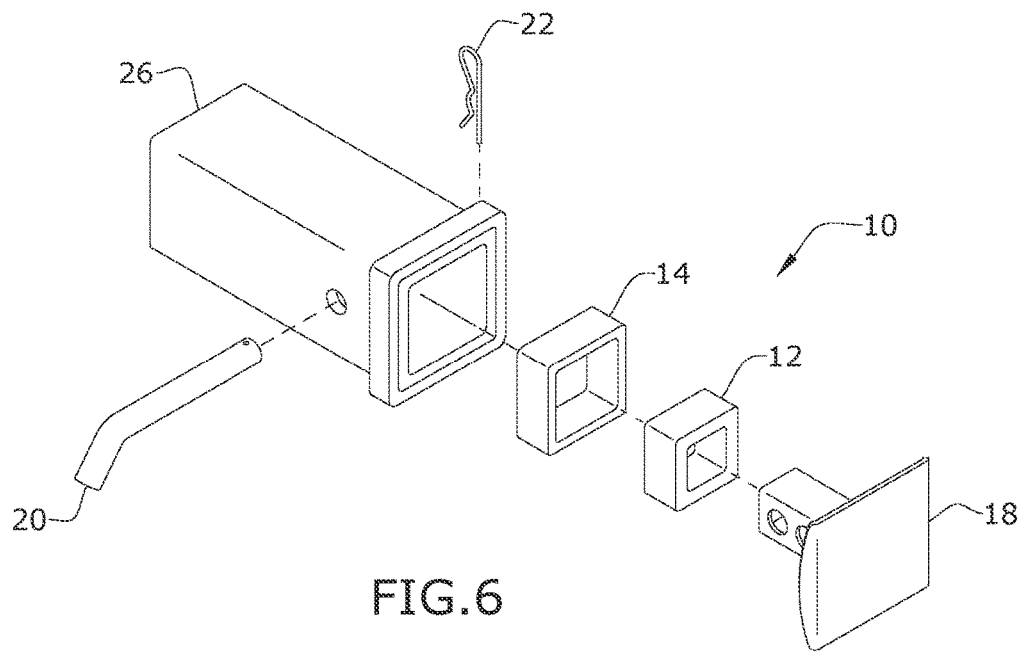
FIG. 6 is an exploded view of the embodiment of the present invention, shown with a moderate size receiver.
Figure 7:
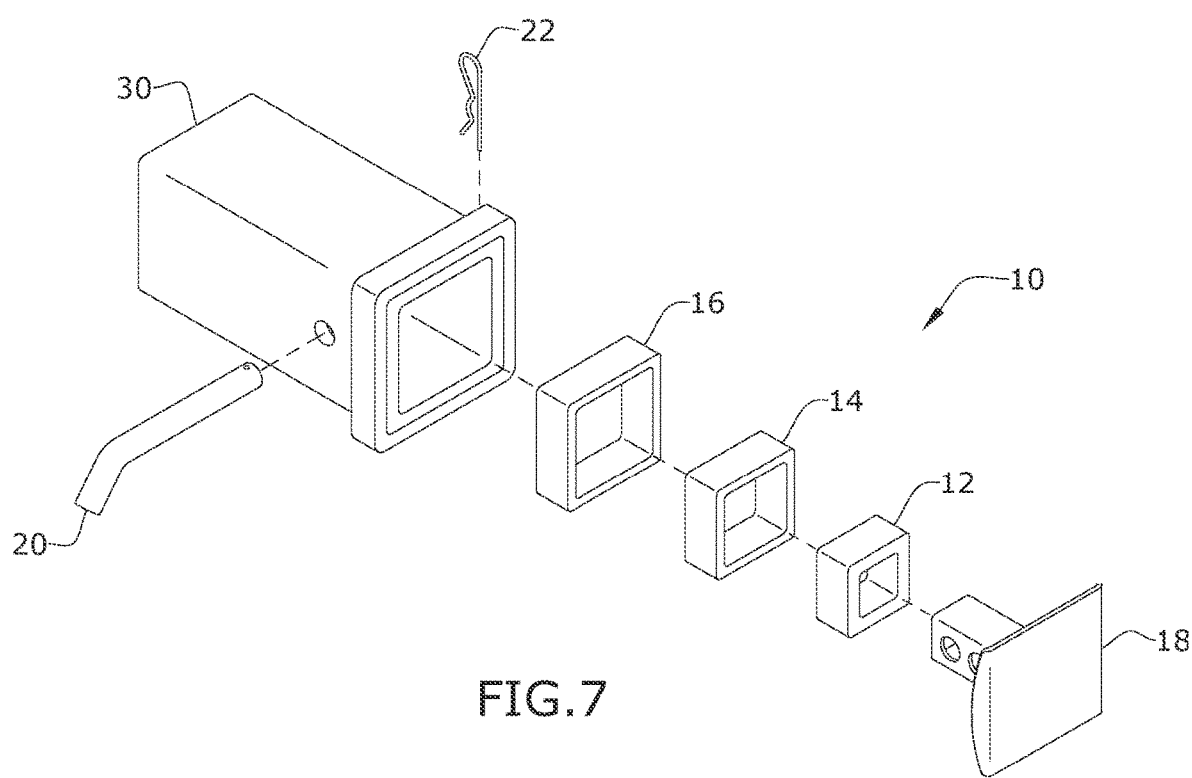
FIG. 7 is an exploded view of the embodiment of the present invention, shown with a large size receiver.

Referring now to FIG. 1, generally a hitch cover 18 is shown that, in use, is inserted into a substantially square-shaped opening in the receiver 24. As shown in FIGS. 5-7, these receivers can be provided in various sizes such as, but not limited to, a 2-inch receiver 24, a 2.5-inch receiver 26, and a 3-inch receiver 30. As clarification, the sizes of the receivers listed above correspond to the length of a side of the square-shaped opening defined by the respective receiver. By way of example, a 2-inch receiver corresponds to a receiver with a 2-inch by 2-inch square opening. Of course, the present invention may be implemented using any appropriate receiver dimensions and is only limited by the appended claims to this application.

The hitch cover 18 is generally composed of a tube portion, that is inserted into the receiver (e.g., the 2.5-inch receiver 26, as shown in FIG. 1), and an outer-facing cover portion, which is oftentimes ornamental in nature. As shown, for example, in FIGS. 4 and 5, to retain the hitch cover 18 in place, a hitch cover pin 20 is inserted through a pair of aligned circular openings in the receiver and through a pair of aligned circular openings in the hitch cover 18. After inserted therethrough, the pin 20 may be retained in position by various means, such as a cotter pin 22.

As shown in FIGS. 1 and 4-7, the tube portion of the hitch cover 18 is dimensionally too small to couple with the hitch receiver 24. In the presently illustrated embodiment, the tube portion is a 1.25-inch tube portion (it is also square-shaped). Advantageously, a hitch insert set 10 is provided to allow assembly between differently sized receivers with the smaller hitch cover 18. The hitch insert set 10 includes an inner insert 12, a middle insert 14, and an outer insert 16. Each insert 12, 14, 16 may be formed from a foam material and cut to shape. Foam is preferably utilized due to its ability to deform and its relatively high coefficient of friction, allowing for snug fits between mating parts. Further, it will be appreciated that any appropriate manufacturing method may be used in accordance with the present invention, such that the ends discussed herein are achieved.

Figure 2:
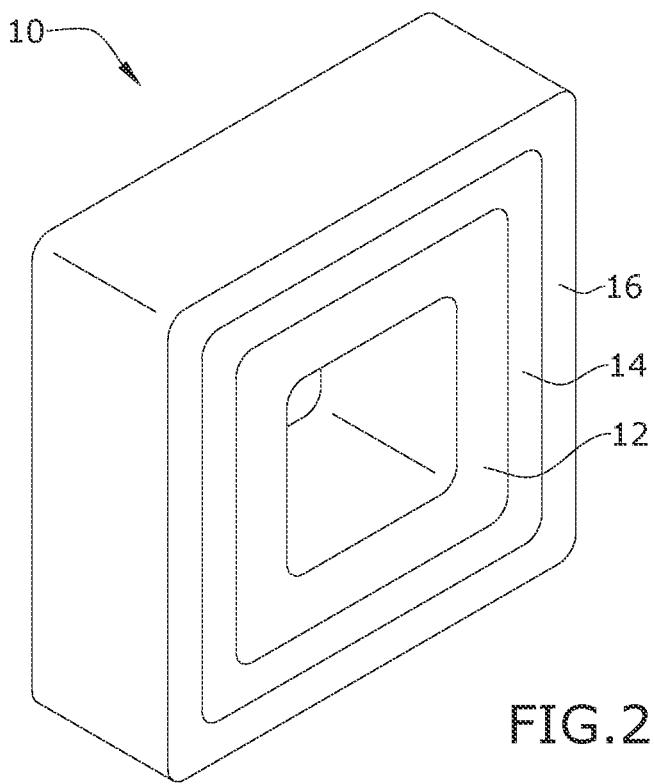
FIG. 2 is a perspective view of the embodiment of the present invention.
Figure 3:
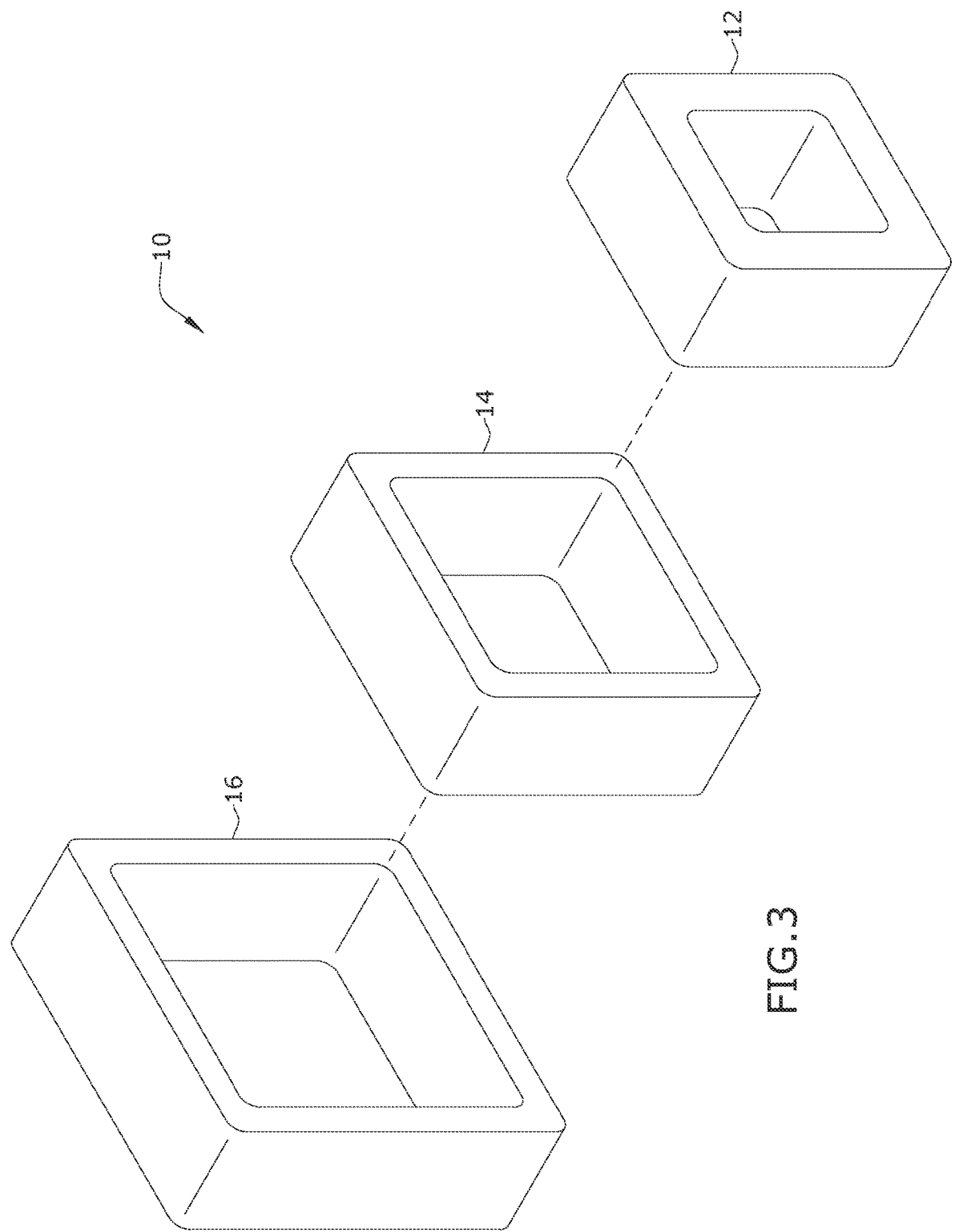
FIG. 3 is an exploded view of the embodiment of the present invention.
Figure 4:
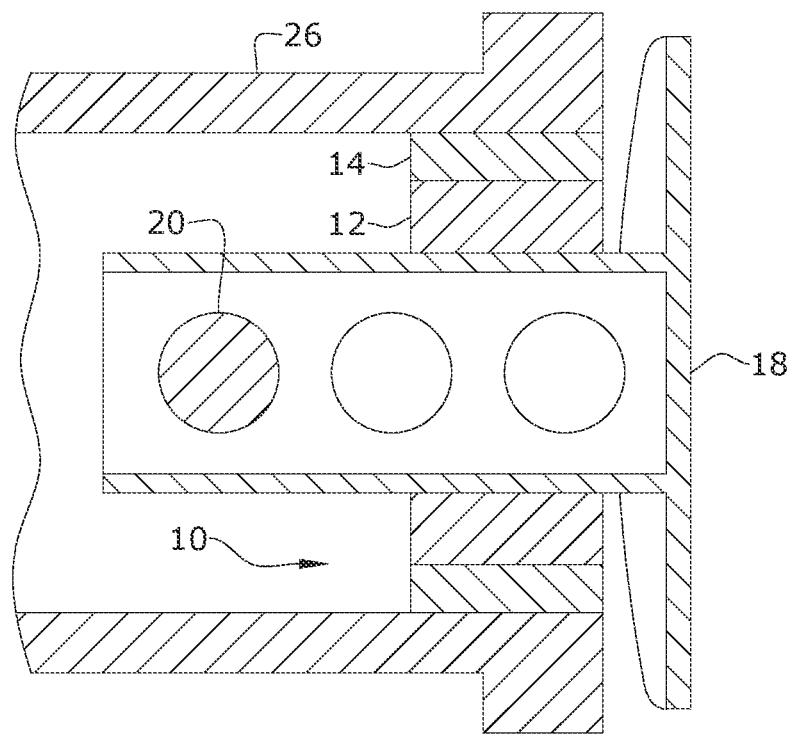
FIG. 4 is a section view taken along line 4-4 of FIG. 1.

As shown in FIG. 2, these inserts 12, 14, 16 nest within one another to reduce an overall inner opening size of the set 10. This inner opening of the innermost insert used slidably receives the tube portion of the hitch cover, in use, with the outermost insert used fitting into the hitch receiver. FIG. 4 illustrates these engagements previously described (between the innermost insert and the hitch cover 18 and the outermost insert and inner walls of the receiver).

Various scenarios of how this set 10 may be used are shown in FIGS. 4-7. FIG. 5 illustrates how the 1.25-inch hitch cover 18 may be connected with a 2-inch receiver 24. In this scenario, only the inner insert 12 is needed to provide a buffer between the hitch cover 18 and the receiver 24. The inner insert 12 may be slid onto the tube portion of the hitch cover 18, and the hitch cover 18 then slid into the opening of the receiver 24. Alternatively, the inner insert 12 may first be slid into the opening of the receiver 24, with the hitch cover 18 then slid into the inner insert opening. Because the inner insert 12 encircles the tube portion, this allows the openings in the hitch cover 18 and the receiver 24 to be aligned such that that the hitch cover pin 20 may properly extend therethrough.

The scenarios illustrated in FIGS. 6 and 7 function in a similar manner, with the main difference being that the middle insert 14 may be nested with the inner insert 12 to accommodate a 2.5-inch receiver 26 (FIG. 6), and the outer insert 16 may further be nested with the middle insert 14 to accommodate a 3-inch receiver 30 (FIG. 7). It will be appreciated that, in certain embodiments, the inner insert 12 may be omitted and only the middle insert 14, only the outer insert 16, or only the middle insert 14 and outer insert 16 be used (e.g., when the hitch cover 18 is larger than the smallest sized part of the insert set).

Those with skill in the art will appreciate that even further combinations exist and are in accordance with the present invention. Further, while only three inserts in a set 10 are described with respect to the figures, any number of inserts may be provided as nestable with one another to function as described. In all described and non-described scenarios, the insert set 10 functions to permit a single hitch cover 18 to be used with differently sized receivers. This results in many benefits, including providing an easy way to swap a hitch cover 18 from one vehicle to another.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein.

While apparatuses and methods are described in terms of "comprising," "containing," or "including" various components or steps, the apparatuses and methods can also "consist essentially of" or "consist of" the various components and steps. All numbers and ranges disclosed above may vary by some amount. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

Moreover, the use of directional terms such as above, below, upper, lower, upward, downward, left, right, and the like are used in relation to the illustrative embodiments as they are depicted in the figures, the upward or upper direction being toward the top of the corresponding figure and the downward or lower direction being toward the bottom of the corresponding figure.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A hitch system comprising:
a hitch receiver configured to couple to a vehicle, the hitch receiver defining a receiver opening;
a hitch cover comprising a tube portion and a cover portion that substantially covers the receiver opening; and
at least one hitch insert coupled to the hitch receiver and the tube portion,
the at least one hitch insert being shaped and dimensioned such that the at least one hitch insert fills a gap defined between the hitch receiver and the tube portion of the hitch cover, and
the tube portion being coupled within the receiver opening such that the tube portion is at least partially retained in place by the at least one hitch insert.

2. The hitch system of claim 1, wherein the receiver opening is substantially square-shaped and wherein the at least one hitch insert is substantially square-shaped, with a cavity formed in a central portion thereof.

3. The hitch system of claim 1, wherein the at least one hitch insert extends around a perimeter of the tube portion.

4. The hitch system of claim 1, wherein the at least one hitch insert is formed from a foam material.

5. The hitch system of claim 1, wherein the at least one hitch insert comprises a first hitch insert and a second hitch insert, with the second hitch insert nesting in the first hitch insert.

6. The hitch system of claim 5, wherein the first hitch insert and the second hitch insert are each substantially square-shaped, with each defining a cavity in a central portion thereof.

7. The hitch system of claim 1, wherein the at least one hitch insert comprises a first hitch insert, a second hitch insert, and a third hitch insert, with the second hitch insert nesting in the first hitch insert and the third hitch insert nesting in the second hitch insert.

8. The hitch system of claim 7, wherein the first hitch insert, the second hitch insert, and the third hitch insert are each substantially square-shaped, with each defining a cavity in a central portion thereof.

9. The hitch system of claim 1, further comprising a hitch cover pin, with the at least one hitch being disposed between the hitch cover pin and the cover portion.

10. A method of coupling a hitch cover to a hitch receiver, the method comprising:
   providing a hitch receiver configured to couple to a vehicle, the hitch receiver defining a substantially square-shaped receiver opening;
   providing a hitch cover comprising a tube portion and a cover portion that substantially covers the receiver opening;
   providing at least one hitch insert coupled to the hitch receiver and the tube portion, the at least one hitch insert being shaped and dimensioned such that the at least one hitch insert fills a gap defined between the hitch receiver and the tube portion of the hitch cover; and
   coupling the tube portion within the receiver opening such that the tube portion is at least partially retained in place by the at least one hitch insert.

* * * * *